United States Patent [19]
Dowden et al.

[11] Patent Number: 5,923,247
[45] Date of Patent: Jul. 13, 1999

[54] FAULT MONITORING

[75] Inventors: Antoinette Dowden, Colchester; Michael John Edwards; Steven John Chapman, both of Ipswich; Michael O'Malley, Woodbridge, all of United Kingdom

[73] Assignee: British Telecommunications public limited company, London, United Kingdom

[21] Appl. No.: 08/860,049

[22] PCT Filed: Dec. 22, 1995

[86] PCT No.: PCT/GB95/03025

§ 371 Date: Jul. 14, 1997

§ 102(e) Date: Jul. 14, 1997

[87] PCT Pub. No.: WO96/20549

PCT Pub. Date: Jul. 4, 1996

[30] Foreign Application Priority Data

Dec. 23, 1994 [EP] European Pat. Off. ............. 94309760

[51] Int. Cl.[6] .................................................. G08B 26/00
[52] U.S. Cl. .......................... 340/506; 340/500; 340/526; 364/185; 455/423
[58] Field of Search ................................. 340/506, 500, 340/501, 511, 526; 364/143, 140, 141, 184, 185; 11/11; 455/423

[56] References Cited

U.S. PATENT DOCUMENTS

| | | |
|---|---|---|
| 4,039,768 | 8/1977 | O'Maley . |
| 4,142,238 | 2/1979 | Brandt et al. ............................. 340/526 |
| 4,527,271 | 7/1985 | Hallee et al. ............................ 364/184 |
| 4,541,386 | 9/1985 | Kishi et al. . |
| 4,543,567 | 9/1985 | Shirata et al. ........................... 340/519 |
| 4,768,377 | 9/1988 | Habelmann et al. . |
| 4,996,703 | 2/1991 | Gray ......................................... 379/40 |
| 5,271,011 | 12/1993 | McMullan et al. . |
| 5,390,231 | 2/1995 | Hung et al. ............................... 379/26 |
| 5,646,864 | 7/1997 | Whitney .................................. 364/514 |

FOREIGN PATENT DOCUMENTS

A 0 141357 5/1985 European Pat. Off. .
A2222351 2/1990 United Kingdom .

OTHER PUBLICATIONS

IBM Technical Disclosure Bulletin, vol. 35, No. 7, New York US, pp. 103–107, XP000332967 "Two stage method for managing link performance counters," Dec. 1992.

Patent Abstracts of Japan, vol. 16, No. 488 (E–1277), Oct. 9, 1992 & JP A, 04 178102 (Toshiba Corp), Jun. 26, 1992.

ESI Publications, Paris, Jan. 1984, Electronique, Techniques et Indusstries (Paris), No. 5 pp. 35–43, "Analyse des performances en fonction des erreurs des systèmes de transmission numérique", P. Huckett, G. Throw.

*Primary Examiner*—Donnie L. Crosland
*Attorney, Agent, or Firm*—Nixon & Vanderhye P.C.

[57] ABSTRACT

Faults occurring in a telecommunications system are monitored identifying their time of onset and reporting them to an operator through an interface if they have not cleared within a predetermined interval. Transient faults, which do clear within that interval, are not reported directly, but only if such faults occur more frequently than a predetermined rate. This is determined by establishing a scan interval, and an analysis period equal to a plurality of scan intervals, monitoring the system continuously for the occurrences of faults, and storing their times of occurrence in a store. At the end of each scan interval, the number of occurrences of the fault during the analysis period which ends at the end of the scan interval are counted by a counter. If the number of occurrences of the fault in the analysis period is equal to or greater than a threshold value selected by user input an alarm indicator is activated. This allows isolated transient faults to be disregarded, allowing the user to concentrate on recurrent intermittent faults.

23 Claims, 2 Drawing Sheets

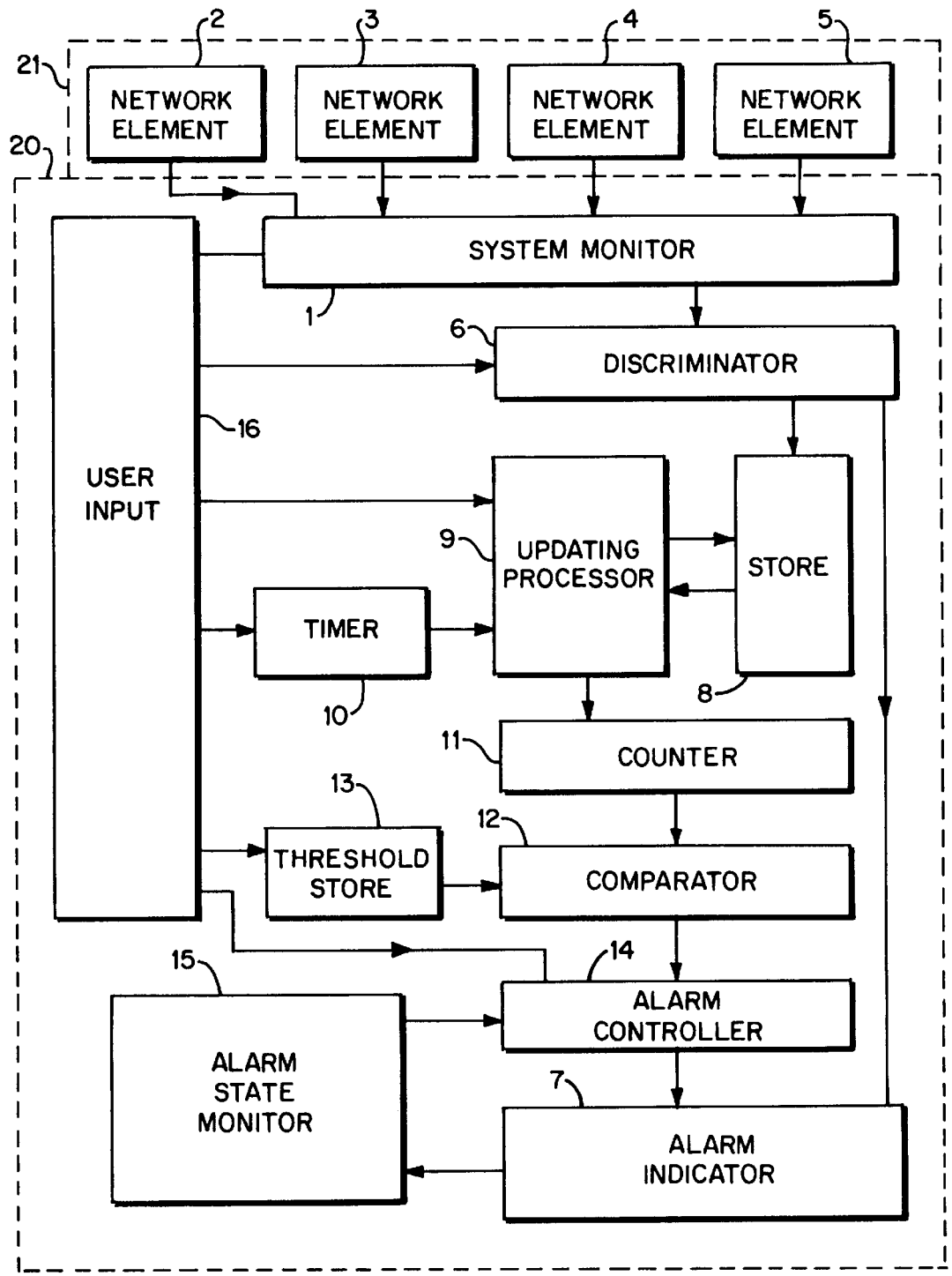

FAULT MONITORING

RELATED APPLICATIONS

This application is related to our copending commonly assigned application Ser. No. 08/727,519 filed Nov. 12, 1996.

BACKGROUND OF THE INVENTION

1. Field of the Invention

This invention relates to the monitoring of a telecommunications system for faults.

2. Related Art

Telecommunication networks have a large number of components distributed over a wide area, and it is important to be able to identify faults when they occur and to deal with them promptly before they manifest themselves to the users of the network as a service interruption. The user of the network, in turn, may have a service level agreement with the network operator which specifies contractual penalties if service interruptions exceed a predetermined limit. Many methods are known for identifying faults and alerting the operators to them so that remedial action can be taken. Included in the term 'fault' for the purposes of this specification are not only equipment or service breakdowns but events such as overloads which may be due to external causes but require remedial action.

Different users of a system need notification in different circumstances. A telecommunications network operator, responsible for monitoring equipment, needs to know of failures of individual equipment. However, it is possible for an item of equipment in a telecommunications network to fail with no immediate effect on the level of service provided to a customer, if for example alternative routings are available, or if the customer is not using the full capacity of the system. Conversely a customer may experience a service interruption when no individual item of equipment has failed, for example if the total demand for use of the system by all customers exceeds the capacity of the system. In order to monitor the service supplied to its customers, the network operator also needs to be informed of such service interruptions.

For example, in a telecommunications network, if a channel is running at full capacity any further call attempts on this channel would fail. If the rate of occurrence of such call failures increases, this indicates that the network is at full capacity for an increasing proportion of the time. Remedial action may be possible, for example by reallocating capacity from elsewhere (e.g. a second channel in a time division multiple access system). In the case of service interruptions to a customer, these can be logged. The nature of the service level agreement will determine what information is required, but in most cases a guaranteed minimum level is agreed. The minimum level may be an agreed proportion of time that the service is available. In other circumstances, for example where re-start procedures are complex, the number of separate interruptions may be used as an additional or alternative criterion.

There is a difficulty in fault monitoring, that phenomena which may be of a transient nature may be indicative of the presence of an actual or imminent underlying problem, but may instead be no more than statistical fluctuations of no significance. A transient fault which appears to clear itself may signify that the cause has ceased, or it may signify that there is a underlying problem and the fault will recur under certain conditions. A particular special case of this problem occurs when an alarm is triggered by a property of the system exceeding a predetermined threshold value. If the threshold value is set too high the alarm indicator will not be triggered until the situation is already critical, leaving no margin in which to take remedial action. However, if the threshold is set too low there will be an excessive number of false alarm indications. The importance of transient faults may differ according to individual customers' requirements. To a customer whose terminal equipment includes error-correction facilities intermittent, transient, faults may be unimportant. However, to a customer for whom any interruption, however short, necessitates a re-start operation involving complex security procedures or a site visit to re-set equipment, a large number of transient interruptions are much worse than a single interruption of longer length.

Transient faults have to be handled differently from non-transient faults. Transient faults clear themselves, so there is no need to take any remedial action to clear them manually. However, because they clear themselves, it is difficult to investigate the cause of a transient fault, or to identify patterns which may indicate an underlying problem.

A prior art fault-monitoring system is known from IBM Technical Disclosure Bulletin No. 7 (December 1992). Each second, this system records whether or not a fault is present, by detecting transmission errors. An alert is sent if the number X of individual seconds in which a fault was detected in a period of 15 minutes exceeds a first threshold L or if in a period of 24 hours the number Z of individual seconds in which a fault was detected exceeds a second threshold which is, in proportion to the size of the measurement period, much lower than L. This arrangement allows statistically significant changes in fault rate to be detected for both long and short periods, allowing sudden large changes to be detected promptly, and also detecting smaller long-term changes which, because of the larger sample size, are statistically significant, without false alerts caused by normal short-term statistical fluctuations.

This prior art system only monitors the number of seconds in which a fault is present. It takes no account of the duration of the individual faults. For example, a report of nine "errored seconds" in a 15 minute period could be caused by nine individual faults each of less than one second, or a single fault of nine seconds. It also makes no provision for separate faults occurring simultaneously, or of overlapping duration; only a maximum of one fault per second can be recorded.

SUMMARY OF THE INVENTION

According to a first aspect of the invention, there is provided a method of monitoring a telecommunications system for faults and generating alarms in response to the faults, said method comprising the steps of monitoring the system for the occurrence of faults, and activating an alarm indicator if the number of occurrences of faults counted during a predetermined time interval is equal to or greater than a threshold value.

According to a second aspect, there is provided an apparatus for monitoring a telecommunications system for faults, comprising an alarm indicator, detection means for detecting occurrences of faults, counting means for counting the number of occurrences of the faults detected by the detection means which occur within a predetermined analysis period, and activation means for causing the alarm indicator to be activated if the number stored in the counting means equals or exceeds an activation threshold value.

This arrangement measures the frequency of occurrence of actual faults, rather than, as in the prior arrangement discussed above, the proportion of time that a fault or faults are present. By generating alarm indications in response to the frequency of occurrence of faults a better indication is available to the system operator as to whether the fault requires attention, than if transient occurrences are alerted directly to the operator. For a user, the system can be used to identify the number of times the service is unavailable.

Preferably, the method comprises the steps of establishing an analysis period;

monitoring the system continuously for the occurrences of faults;

at the end of a scan interval shorter than the analysis period, counting the number of occurrences of the fault during the analysis period which ends at the end of the scan interval; and activating an alarm indicator if the number of occurrences of the fault in the analysis period is equal to or greater than a threshold value.

Preferably, the times of onset and clearing of faults are recorded, and at the end of each scan interval faults for which a time greater than the analysis period has elapsed since the recorded clear time are not counted.

In a preferred arrangement, the alarm indicator is deactivated if the number of occurrences of the fault in the analysis period is equal to or less than a second threshold value, the second threshold value being less than the first threshold value.

Preferably the alarm indicator is maintained in its current state if the number of ocurrences of the fault in the analysis period is between the first and second threshold values.

In another arrangement a further alarm indicator is also activated if the number of occurrences of the fault in the analysis period is equal to or greater than a threshold value, and the further alarm indicator remains activated until acknowledged by an operator.

Preferably the duration of each fault is measured, and if the duration of a fault exceeds a predetermined value an alarm indicator is activated. In this way a fault which does not clear spontaneously within a predetermined period, and must be acted on, can be readily distinguished from transient fault reports which can be stored for subsequent analysis, without the system operator having to be alerted to every individual transient fault. This additional feature is the subject of our co-pending PCT application filed on the same day as the present case, and claiming the same priority, Agents Ref A24849.

Preferably the times of the onset and clearing of faults are recorded, and after the onset time of a fault is recorded, a delay period is initiated and, if the clearing of the fault is recorded before the expiry of the delay period the stored value is incremented, and if the delay period expires before the clearing of the fault is recorded an alarm indicator is activated.

Preferably also the system is monitored for occurrences of unavailability of the system, or a function of the system, to a user.

This alarm indicator may the same one as that activated if the number of faults in an analysis period exceeds the threshold value. It may be arranged to remain activated as long as either the stored value exceeds the second threshold or a fault of duration greater than the predetermined value remains uncleared. The alarm may have different activation states dependent on whether the stored value remains above its threshold, or a long duration fault remains uncleared, or both.

The counting means may comprise a store, arranged to store the number of occurrences of the fault condition within each one of a plurality of scan intervals whose total duration is that of the analysis period. The durations of the predetermined analysis period and of the scan interval may be selectable.

Preferably the equipment includes an updating processor arranged, at the end of each scan interval, to retrieve the data stored in the store and to supply it to the counting means, and to instruct the store to delete the data relating to the earliest scan interval for which data is stored.

Preferably there is provided discrimination means for distinguishing occurrences of the fault condition having a first predetermined characteristic from those having a second predetermined characteristic, the counting means being arranged to count those occurrences having each characteristic separately, or to count only one of the types. The counting means may also be arranged to be over-ridden, thereby suspending its operation. This allows routine tests and pre-arranged breaks in service to be discounted from the analysis, to avoid the generation of false alarms.

BRIEF DESCRIPTION OF THE DRAWINGS

An embodiment of the invention will now be described, by way of example only, with reference to the drawings, in which

FIG. 2 is a functional block diagram showing the various components of an apparatus according to the invention for monitoring a telecommunications network for intermittent fault conditions, together with elements of the network to be monitored.

DETAILED DESCRIPTION OF EXEMPLARY EMBODIMENTS

Figure 1:
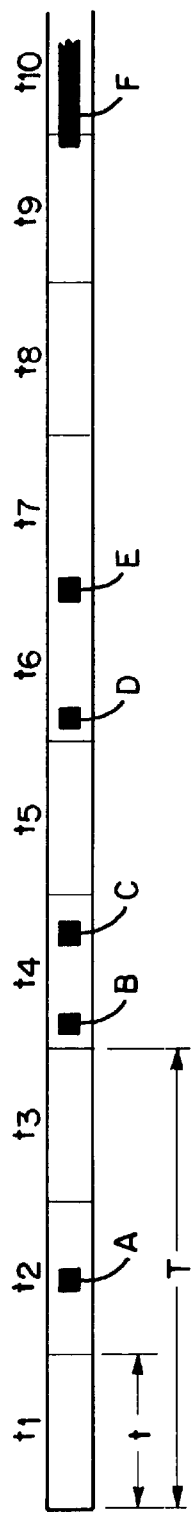
FIG. 1, is a diagrammatic representation of a sequence of faults occurring in a telecommunications system.

FIG. 1 shows a time sequence of transient faults of a particular type occurring in a telecommunications system which is to be monitored by an apparatus embodying the invention. For example, the system may be a telecommunications network and the faults may be overloads in a communication channel, and breaks in service to a specific customer.

In the monitoring apparatus, to be described below with reference to FIG. 2, the time is divided into a number of scan intervals $t_1$, $t_2$, etc each of length t. In this embodiment the scan interval is substantially longer than the duration of the faults, and it is possible for more than one fault to occur in the same scan interval. An analysis period T is defined. In this illustrative example the analysis period T is three times the length of the scan interval t. However, in practice the analysis period could be very much longer than this.

In this invention, a distinction is made between transient faults and those of longer duration. When a fault is identified a delay period is initiated. The length of the delay period may be configurable for different customers and for different services. If the fault does not clear during the delay period an alarm indicator is triggered. This alarm indicator may be the same as the one triggered if the threshold number is exceeded, but preferably the alarms are distinct from each other, or the alarm has distinct activation states, so that single long interruptions and a series of short interruptions can be distinguished, allowing the operator to prioritise his actions in response to the alarms. However, if the fault does clear during the delay period the fault is classed as a transient alarm and a service level transient fault score for the current scan interval increased by one. If the predetermined fault occurs and clears more than once in the same scan interval the final transient fault score for the scan interval will be the number of times the fault occurred in that interval. A separate alarm may be provided which remains activated after a transient fault is reported, until the alarm is cleared by being acknowledged by the operator.

In this example transient faults A, B, C, D, E, occur in scan intervals $t_1$, $t_4$ (twice), $t_6$, and $t_7$ respectively.

At the end of each scan interval the apparatus counts the number of faults which have occurred during the analysis period T, in this example comprising the last three scan intervals, and an alarm indicator is triggered if the number reaches or exceeds a threshold value, in this example set at 3. Only when the number in the analysis period falls to or below a second threshold value, in this example 1, is the alarm indicator cleared. Different thresholds are selected to avoid the occurrence of intermittent alarms which might otherwise occur when the rate of occurrence of transient fault is close to a single threshold value. For example, at the end of the scan interval $t_3$ only one fault, A, is counted in analysis period $t_1+t_2+t_3$. At the end of the next scan interval $t_4$ three faults, A, B, C are counted in the analysis period $t_2+t_3+t_4$ and the alarm indicator is triggered. At the end of the next scan interval $t_5$ only two faults are counted, because fault A is now outside the analysis period $t_3+t_4+t_5$. Although two faults is below the alarm threshold value of 3, the alarm is not cleared because the number of faults in the analysis period has not fallen to the second threshold value.

At the end of scan interval $t_6$ there are once again three faults; B, C, D, within the analysis period. At the end of scan interval $t_7$ there are only two faults, D and E, because although fault E (in scan interval $t_7$) is added, faults B and C are now outside the analysis period $t_5+t_6+t_7$. However, the alarm indicator again remains on, because the 'clear' threshold has not been passed. At the end of period $t_9$, only fault E is within the analysis period $t_7+t_8+t_9$, and so the number of faults has fallen to the threshold and the alarm indicator clears. However, had fault 'E' been followed in period $t_8$ or $t_9$ by a group of one or more further faults, the second threshold would not have been reached and the alarm indicator would not clear.

It should be noted that the fault E, although starting in period $t_6$, is counted as being in period $t_7$, the period in which it clears. This avoids double-counting of fault E. The clear time is used because at the end of scan interval $t_6$ the duration of the fault is indeterminate, and it may be a long duration fault (see fault F in scan intervals $t_9$, $t_{10}$).

Referring now to FIG. 2, there is shown a functional block diagram of the functional components of an apparatus 20 for monitoring faults in a telecommunications network 21, the network including elements 2 to 5. These elements may be functional components of the network, or they may be elements of the service provided by the network to a customer.

Figure 3:
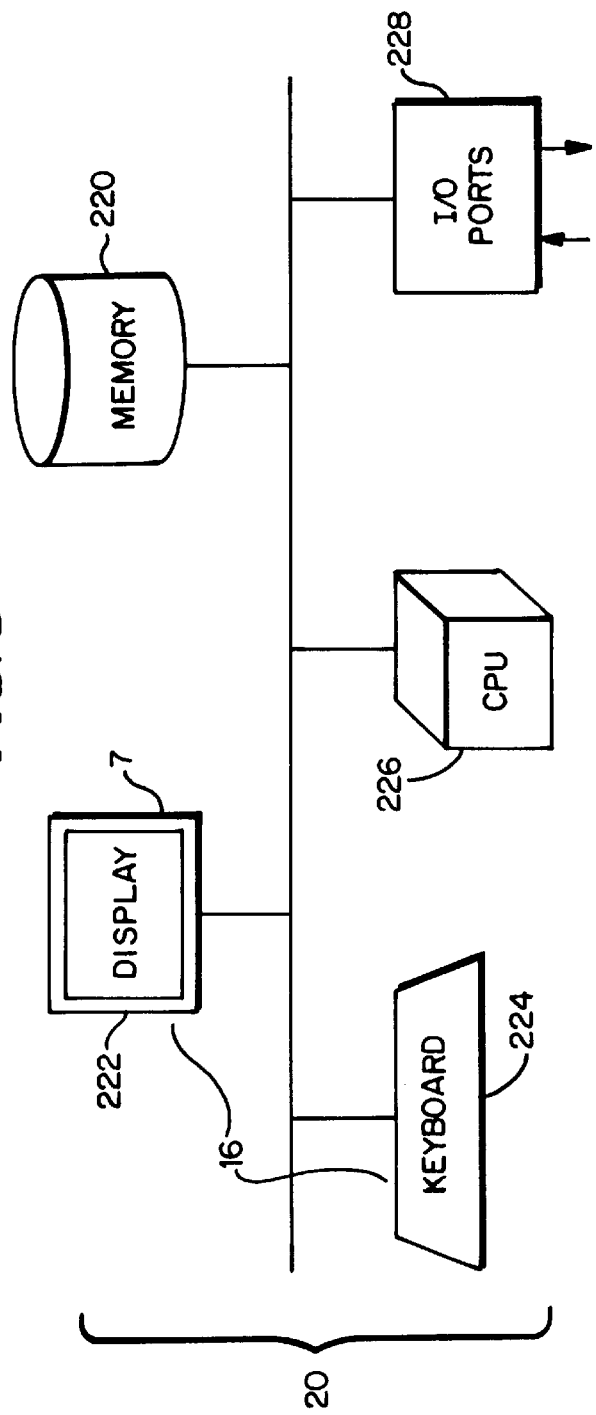
FIG. 3 shows the general construction of a computer suitable for operation of the invention.

The apparatus 20 is realised on a computer of conventional construction as shown in FIG. 3 and which comprises a memory 220, a display screen 222 and keyboard 224, a central processing unit 226 and an interface 228. The memory 220 may be implemented as a combination of a hard disk, random access memory (RAM) and Read-only Memory (ROM).The computer has a program stored in its memory 220 and the program includes a set of program modules corresponding to the functional components 1, 6, 7, 8, 9, 10, 11, 12, 13, 14, 15 and 16 shown in FIG. 2.

The apparatus 20 comprises a fault monitor 1 for monitoring the network 21 for faults in various elements 2, 3, 4, 5 of the network 21. The monitor 1 provides an output first to a fault duration discriminator 6 which identifies whether the fault is of long or short duration. If the fault has cleared within a predetermined time the discriminator 6 causes information about the fault to be transmitted to store 8. The information stored about each fault includes information about the network elements 2, 3, 4 or 5 to which it relates, the time of onset of the fault, and the time of clearing the fault. The times of onset and clearing may be reported by the relevant network element 2, 3, 4, or 5, or by the monitor 1. If the fault has not cleared within the predetermined time the discriminator causes an alarm 7 to be activated, to indicate a non-transient fault to the user on the display 222. For some purposes it may also be necessary for a user to be alerted to transient faults as they occur, for example if equipment needs re-setting after an interruption. If such an arrangement is required the alarm 7 is activated whenever the monitor 1 detects a fault.

An updating processor 9 periodically retrieves the data from store 8, at a scanning interval t controlled by a timer 10. The updating processor 9 instructs the store 8 to delete information relating to any faults for which a period T (the analysis periods has elapsed since they cleared. The analysis period T and scan interval t are both selectable, subject to the scan interval not exceeding the analysis period. The analysis period T is typically several times the scan interval t, so that at the end of each scan interval the faults in the previous T/t scan intervals are retrieved. The processor 9 then passes the data to a counter 11 which counts the number of faults relating to each element 2, 3, 4, 5 which cleared within the previous analysis period. The values obtained are passed to a comparator 12 which compares the values with activation and deactivation threshold values stored in threshold store 13, and the result is passed to an alarm controller 14. The alarm controller 14 also receives an input from an alarm state monitor 15, and causes the alarm indicator 7 to be operated (activated or cleared) in accordance with its pre-existing state and the results from the comparator 12 according to the truth table below.

| | EVENT COUNT | | |
|---|---|---|---|
| | DEACTIVATION THRESHOLD OR BELOW | BETWEEN THRESHOLDS | ACTIVATION THRESHOLD OR ABOVE |
| ALARM ACTIVATED | SWITCH OFF | LEAVE ON | LEAVE ON |
| ALARM NOT ACTIVATED | LEAVE OFF | LEAVE OFF | SWITCH ON |

Thus when the count value is equal to or less than the deactivation threshold the alarm indicator is off. If it rises to the deactivation threshold the alarm indicator 7 remains 'off' until, if it rises to or above the activation threshold, the alarm indicator is switched on. If it is between the thresholds the alarm indicator remains in the 'on' condition. If it falls further, to the deactivation threshold or below, the alarm is switched off.

The alarm indicator may be held in its activated state until a predetermined number of scan intervals have elapsed since its activation, even if the deactivation threshold is passed, in order to allow sufficient time for it to come to the attention of the operator. Alarms may also be cleared manually. A separate alarm may be provided which remains activated after a transient fault is reported, until the alarm is cleared by being acknowledged by the operator A user input 16 associated with the keyboard 224 or another input device (e.g. a "mouse") allows the fault duration used by the fault duration discriminator 6, the scan interval used by timer 10, the analysis period used by updating processor 9, and the threshold values stored In threshold store 13 to be selected, and allows the selection of those of the elements 2, 3, 4, 5 which are to be monitored by monitor 1.

The alarm indicator 7 provides information to the user concerning which of the elements 2, 3, 4, 5 has caused the alarm indicator 7 to be activated and whether the activation was because of a long duration fault or an accumulation of shorter faults.

The operation of the apparatus will now be described with reference to the sequence of faults shown in FIG. 1. For the sake of illustration, only a single element 2 is monitored, the long/short fault threshold is set to 5 minutes, the scan interval to 20 minutes, the analysis period to 1 hour, the alarm indicator activation threshold to 3 and the alarm indicator deactivation threshold to 1. These values have been selected for illustrative purposes only, and are not necessarily representative of appropriate values for a practical system. It is assumed that no faults are recorded in store 8 at the start of the time period illustrated, and that the alarm indicator 7 is not already activated.

Timer 10 triggers the updating processor 9 to operate every 20 minutes. At the first such operation, at the end of scan interval $t_1$, store 8 contains no data, so the updating processor 9 retrieves no data from store 8. Counter 11 passes a zero result to comparator 12 which compares this result with the activation and de-activation thresholds. Since the zero count is less than both thresholds the alarm indicator 7 is not activated. During the second scan interval $t_2$ fault A is detected by monitor 1. This fault clears before the 5 minute threshold set by discriminator 6 and so data concerning fault A is passed to store 8. At the end of the scan interval updating processor 9 retrieves the data on fault A, but does not delete fault A from store 8, because a time less than the analysis period T has elapsed since its occurrence. The data is passed to counter 11 and the value 1 is compared in comparator 12 with the values stored in threshold store 13. The counter is now at the deactivation threshold, but the alarm indicator 7 is already not activated and the count is still less than the activation threshold so the alarm indicator 7 is not activated.

Similarly, at the end of the scan interval $t_3$ no faults have been added to store 8, and no faults have been in the store for longer than the analysis period T, so the updating, counting and comparing processes are as for the previous scan interval $t_2$.

During scan interval $t_4$ two short faults B, C occur. These are added to store 8 in the same way that fault A was recorded in scan interval $t_2$. At the end of scan interval $t_4$ the counter 11 now counts three faults. This value 3 is compared with the value stored in threshold store 13 and is found to be at the activation threshold value. The output from the comparator 12 is input to alarm indicator control 14 together with an input from the alarm indicator state monitor 15, which indicates that the alarm indicator is currently not activated. This causes the alarm control 14 to activate the alarm indicator 7.

During scan interval $t_5$ no further faults occur. At the end of the scan interval $t_5$ the updating processor identifies fault A as having occurred more than time T before the present, having occurred in scan interval $t_2$. Fault A is thus deleted from the store 8. The counter 11 therefore only counts two faults, (faults B and C) and this value 2 is compared with the threshold values stored in store 13. Although the value has now fallen below the activation threshold it is still above the deactivation threshold so that alarm indicator 7 remains in its present (activated) state.

During scan interval $t_6$ a further fault D occurs, and another fault E is taking place as the scan interval ends. As fault E has not yet cleared it cannot yet be determined whether it will exceed the long/short discrimination threshold.

At the end of scan interval $t_6$ the updating processor therefore finds three faults, B, C, and D stored in store 8, none of which has been stored for longer than the full analysis period T. They are thus not deleted from store 8, and are all counted by counter 11. The value of 3 determined by the counter 11 is compared with the threshold values stored in the threshold store 13 and found to be at the activation threshold. Since the alarm indicator state monitor 15 identifies the alarm indicator 7 as already activated a new alarm indication is hot generated.

In scan interval $t_7$ fault E clears within the long/short discrimination threshold and so is stored in store 8. At the end of the scan interval $t_7$ the updating processor updates store 8 by deleting faults B and C, since the analysis period T has now elapsed since they occurred. The counter 11 therefore counts only two faults, D and E. and this value of two is compared by comparator 12 with the threshold values. Although the value has again fallen below the activation threshold it is still above the deactivation threshold so the alarm indicator 7 remains in its present (activated) state. Similarly in scan interval $t_8$ no new faults occur and none are deleted by the updating processor 9 so the number of faults counted by the counter 11 remains at two and the alarm indicator 7 remains activated.

Towards the end of the scan interval $t_9$ another fault F starts, but has not reached the long/short discrimination threshold or cleared, before, the end of the scan interval. At the end of the period $t_9$ fault D is deleted from store 8 by the updating processor 9 as the analysis period T has now expired for this fault. This leaves only fault E in store 8 to be counted by counter 11. The value output from counter 11 to comparator 12 is therefore 1, which is the deactivation threshold. The alarm control 14 therefore deactivates alarm indicator 7.

During scan interval $t_{10}$, the long/short discrimination threshold expires before fault F clears. At the expiry of this discrimination period, the discriminator 6 identifies the fault as a long fault and activates alarm indicator 7 immediately.

In certain circumstances the system may receive a 'clear' indication when no 'fault' indication has been received. This may occur for example when the system is first set up, or if the 'fault' signal is not received because of another more general fault making it. The system is arranged to disregard any such 'unpaired' clear indication.

The alarm indicator 7 may give information about the faults such as which of the elements 2, 3, 4 or 5 is generating the faults, their total duration and time of occurrence.

The apparatus 20 described above can be used to monitor the performance of a network at any level. For example, a network operator responsible for maintenance of telecommunications equipment may wish to monitor for failures of specific items of equipment. Individual transient interruptions may be insignificant - perhaps caused by an external cause. For example if an equipment failure occurs at one point in the system it will cause an interruption to the operation of many other items of equipment in communication with it. If the network has so-called "self-healing" capabilities, calls can be re-routed to avoid the use of the failed equipment, and only a single transient interruption is detected for the other items. However, if a large number of transient faults are detected at a single item of equipment, this can be indicative of a developing situation in which the performance of that item is deteriorating. This information can be used to take remedial action before the component fails completely, either by re-routing call traffic to avoid or minimize its use, or by repairing the component.

A customer of a service provided by the network is usually not concerned with individual equipment failures provided that the service itself is uninterrupted. Such customers often have service-level agreements with the network operator which specify maximum levels of service interruption (either as a number of individual interruptions or as a proportion of total time). The alarm indicator 7 may include means for recording the details of these interruptions to service to be monitored and recorded so that the network operator and/or the customer can have visibility of the performance of the system. The alarm indicator 7 may monitor the stored details to identify when the proportion of time, or the total elapsed time, for which the service has been interrupted exceeds a predetermined value, and triggering the alarm when this value is exceeded.

What is claimed is:

1. A method of monitoring a telecommunications system for occurences of conditions causing unavailability of a system to a user, and generating alarms in response to such conditions; said method comprising the steps of monitoring the system for the occurrence of one or more such conditions, and activating an alarm indicator if the number of occurrences of such conditions counted during a predetermined time interval is equal to or greater than a threshold value.

2. A method according to claim 1 comprising the steps of:
   establishing an analysis period;
   establishing a scan interval shorter than the analysis period;
   monitoring the system continuously for the occurrences of such unavailability conditions.
   for the or each unavailability condition being monitored, at the end of each scan interval, counting the number of occurrences of the unavailability condition during the analysis period which ends at the end of the scan interval; and
   activating an alarm indicator if the number of occurrences of the unavailability condition In the analysis period is equal to or greater than a threshold value.

3. A method according to claim 2, in which the times of onset and clearing of unavailability conditions are recorded, and at the end of each scan interval unavailability conditions for which a time greater than the analysis period has elapsed since the recorded clear time are not counted.

4. A method as claimed in claim 2 comprising the further step of deactivating the alarm indicator if the number of occurrences of the unavailability condition in the analysis period is equal to or less than a second threshold value, the second threshold value being less than the first threshold value.

5. A method according to claim 4, wherein a further alarm indicator is also activated if the number of occurrences of the unavailability condition in the analysis period is equal to or greater than a threshold value, and the further alarm indicator remains activated until acknowledged by an operator.

6. A method as claimed in claim 1, comprising the further steps of measuring the duration of each unavailability condition, and activating an alarm indicator if the duration of an unavailability condition exceeds a predetermined value.

7. A method according to claim 6, in which the times of onset and clearing of unavailability conditions are recorded, and in which after the onset time of an unavailability condition is recorded, a delay period is initiated, and in which if the clearing of the unavailability condition is recorded before the expiry of the delay period the stored value is incremented, and if the delay period expires before the clearing of the unavailability condition is recorded the alarm indicator is activated.

8. A method as claimed in claim 6, wherein the alarm indicator activated if the duration of an unavailability condition exceeds a predetermined value is the same one as that activated if the number of occurrences of an unavailability condition in an analysis period exceeds the threshold value.

9. A method as claimed in claim 8, wherein the alarm indicator remains activated as long as either the stored value exceeds the second threshold or an unavailability condition of duration greater than the predetermined value remains uncleared.

10. A method as claimed in claim 8, wherein the alarm indicator has different activation states dependant on whether the stored value remains above its threshold, or a long duration unavailability condition remains uncleared, or both.

11. Apparatus for monitoring a telecommunications system for the occurrence of conditions causing unavailability of the system to a user, comprising an alarm indicator, detection means for detecting occurrences of such conditions, counting means for counting the number of occurrences of the conditions detected by the detection means which occur within a predetermined analysis period, and activation means for causing the alarm indicator to be activated if the number stored in the counting means equals or exceeds an activation threshold value.

12. Apparatus according to claim 11 further including a store arranged to store the number of occurrences of the unavailability condition condition within each one of a plurality of scan intervals whose total duration is that of the analysis period.

13. Apparatus according to claim 12, including time recording means for recording the times of onset and clearing of each unavailability condition, and allocation means for allocating the unavailability condition occurrences to predetermined analysis periods and scan intervals in accordance with their time of onset and/or clearing.

14. An apparatus according to claim 12, including an updating processor, the updating processor being arranged, at the end of each scan interval, to retrieve the data stored in the store and to supply it to the counting means, and to instruct the store to delete the data relating to the earliest scan interval for which data is stored.

15. Apparatus according to claim 11 further comprising deactivation means for causing the alarm means to be deactivated if the number stored in the counting means equals or is less than a deactivation threshold value, lower than the activation threshold value.

16. Apparatus according to claim 11 comprising a further alarm indicator which is also activated if the number of occurrences of the unavailability condition in the analysis period is equal to or greater than a threshold value, and means controllable by an operator for deactivating the further alarm indicator.

17. Apparatus according to claim 11, comprising means for measuring the duration of each unavailability condition, and further activation means for activation of an alarm indicator if the duration of an unavailability condition exceeds a predetermined value.

18. Apparatus according to claim 17, the detection means comprising means for detecting the onset and clearing of individual unavailability conditions, the timing means comprising time recording means for recording the times of onset and clearing of each unavailability condition, and delay timing means initiated by the detection of the onset of an unavailability condition, and reset by the detection of the clearing of the unavailability condition for measuring the elapsed time from the onset of the unavailability condition, the activating means being arranged to operate if the elapsed time measured by the delay timing means reaches a predetermined value, the counting being arranged to count an unavailability condition only if the detection means detects the clearing of the unavailability condition before the elapsed time measured by the delay timing means reaches said predetermined value.

19. Apparatus according to claim 17 wherein the further alarm activating means is arranged to operate the same alarm indicator as that activated if the number of unavailability conditions in the analysis period exceeds a predetermined value.

20. Apparatus according to claim 19 wherein the alarm indicator is arranged to remain activated as long as either the stored value exceeds the second threshold or an unavailability condition of duration greater than the predetermined value remains uncleared.

21. Apparatus according to claim 19 wherein the alarm indicator has different activation states dependant on whether the stored value, or the duration of an unavailability condition, or both, remains above its respective threshold.

22. Apparatus according to claim 11 in which the detection means comprises discrimination means for distinguishing occurrences of unavailability condition having a first predetermined characteristic from those having a second predetermined characteristic, the counting means being arranged to count only those occurrences having the first characteristic.

23. A telecommunications system comprising monitoring apparatus according to claim 11.

* * * * *